Oct. 4, 1955  M. E. FRY  2,719,906

DOMESTIC APPLIANCES

Filed June 29, 1950  2 Sheets-Sheet 1

INVENTOR.
Millard E. Fry
BY
Willits Hardman Foler
Attorneys

Oct. 4, 1955　　　M. E. FRY　　　2,719,906
DOMESTIC APPLIANCES
Filed June 29, 1950　　　2 Sheets-Sheet 2

INVENTOR.
Millard E. Fry
BY
Willits Hardman John
Attorney

United States Patent Office 2,719,906
Patented Oct. 4, 1955

2,719,906

DOMESTIC APPLIANCES

Millard E. Fry, Dayton, Ohio, assignor to General Motors Corporation, Dayton, Ohio, a corporation of Delaware Application June 29, 1950, Serial No. 171,096

3 Claims. (Cl. 219—37)

This invention relates to domestic appliances, and more particularly to deep well cookers for electric ranges.

An object of the invention is to provide an improved form of deep well cooker with an electric heater which may be readily adjusted from a lower position to a surface position, and vice versa.

Another object of this invention is to provide a simplified form of adjustable electric heater.

Further objects and advantages of the present invention will be apparent from the following description, reference being had to the accompanying drawings, wherein a preferred form of the invention is clearly shown.

Figure 1:
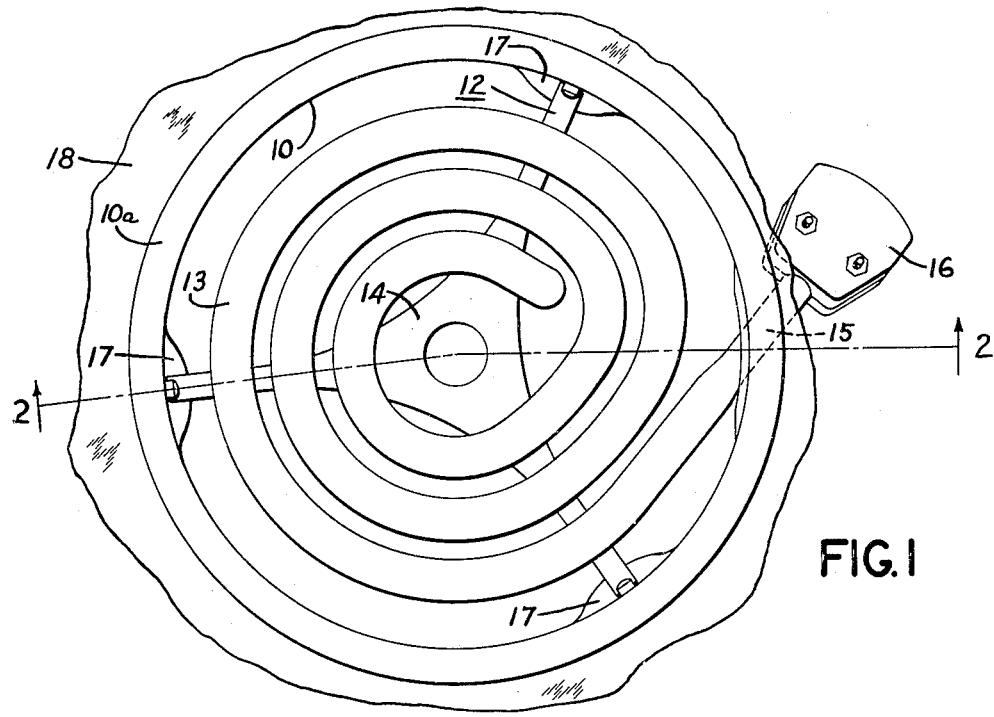
Fig. 1 is a plan view of the deep well cooker with the heater in its lower position.
Figure 2:
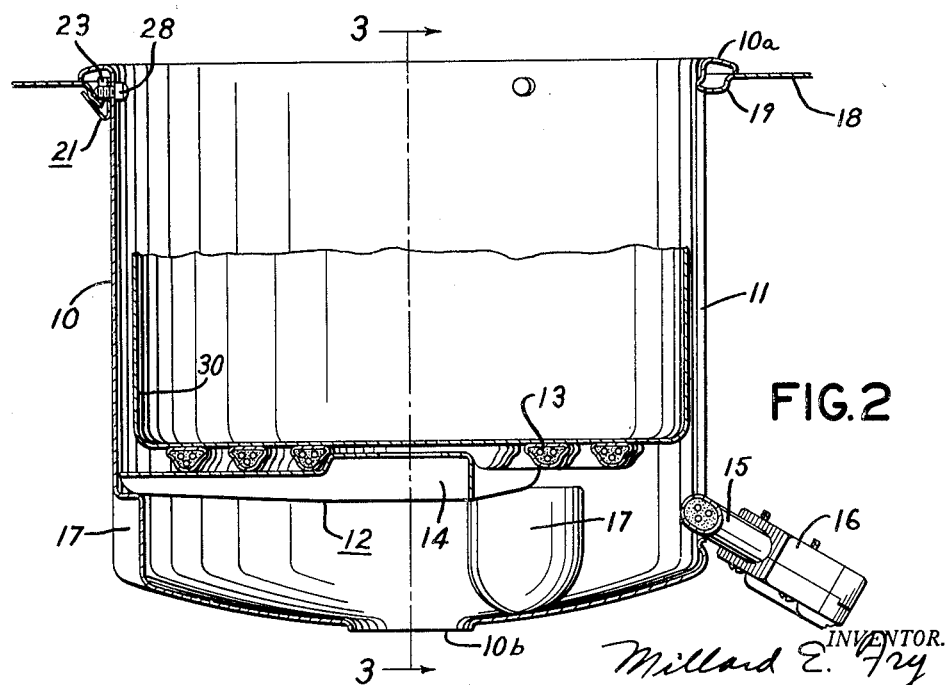
Fig. 2 is a vertical cross-section taken along the line 2—2 of Fig. 1 and with a portion of a cooking utensil inserted.
Figure 3:
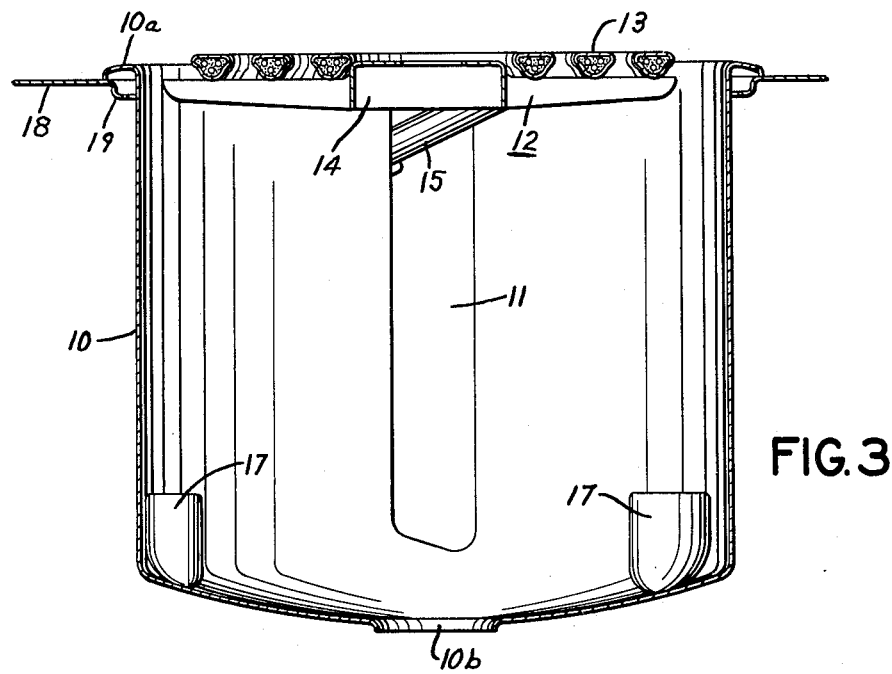
Fig. 3 is a vertical cross-section at right angles to Fig. 2, with the utensil removed.
Figure 4:
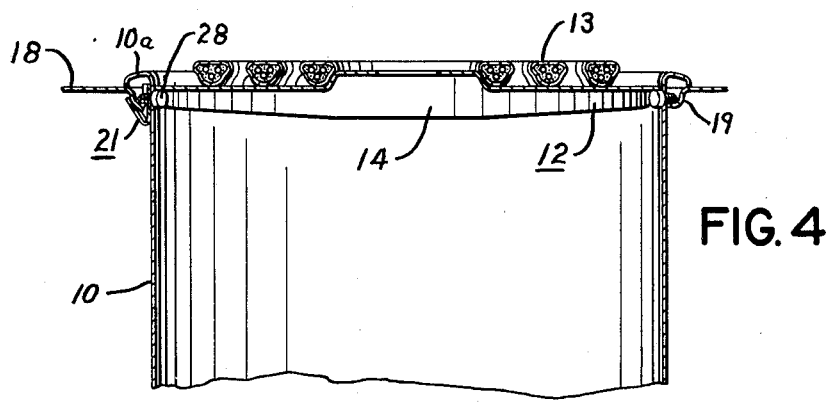
Fig. 4 is a vertical cross-section showing the heater in upper position, the section being taken along the center lines of two spider legs.
Figure 5:
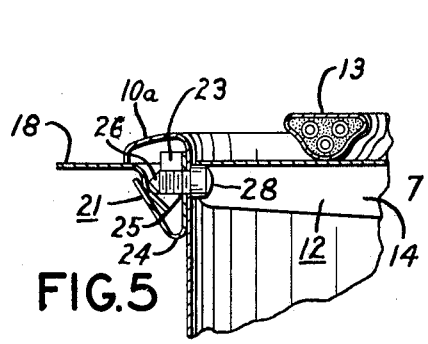
Fig. 5 is an enlarged view of a portion of Fig. 4 showing the well attaching means.
Figures 6, 7:
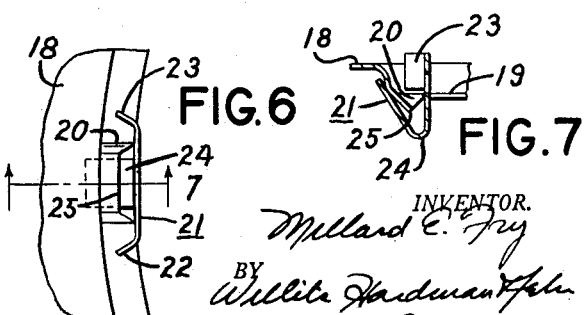
Fig. 6 is a top plan view of a portion of the range cooking top, showing the well holding clip in position; and, Fig. 7 is a vertical cross-section taken along the line 7—7 of Fig. 6.

A deep well casing 10 is provided with a vertical slot 11 in its side wall. A vertically adjustable heating unit 12 is located in said well. The well is provided with supports at the upper and lower parts of the well in a manner that the heating unit may be located in the lower portion of the well to heat a cooking utensil in the well, or the heating unit may be located at the upper part of the well, to be used as a top surface unit to heat cooking utensils at the surface of the range. The well is provided with a top, outwardly directed flange 10a at the top, and a drain opening 10b at the bottom.

Preferably the heating unit comprises a flat spirally wound sheathed heater 13 secured to a spider 14. One end 15 of the sheathed heater 13 extends through the slot 11, and is provided with a terminal block 16 to which the power lines may be secured. The power lines may be of sufficient flexibility and length to permit the heater to be moved between the upper and lower positions.

The lower supports in the well 10 preferably comprise a plurality of lugs 17 formed in the side walls. The number of such lugs preferably corresponds to the number of legs in the spider. The legs of the spider rest upon the upper shelves of the lugs when the heater is in its lower position.

The upper supports for the heater also correspond in number to the number of legs on the spider. Preferably they are combined with a structure adapted to secure the well 10 to the range top 18. The range top 18 preferably is formed of sheet metal and has an opening surrounded by a downwardly and inwardly directed flange 19. A downwardly directed notch 20 is formed in said inwardly directed flange 19. A clip 21 is secured on said inwardly directed flange 19 adjacent each notch 20. The clip includes horizontally extending arms 22 and 23 resting on said inwardly directed flange 19. The clip also includes a downwardly directed hook 24 engaging the lower edge 25 of the notch 20. A screw 26 passes through an opening in the casing 10 into a screw receiving aperture 27 in the body of the clip 21. The screw 26 is provided with a head 28 upon which the legs of the spider are adapted to rest. The clips 21 may be secured temporarily in place on the flange 19 and thereafter the casing 10 may be lowered in place and the screws 26 may be secured to the clips 21. The well casing is thus secured in place by the flange 10a and the clips 21.

Preferably the spider legs are formed of channel-shaped material, with the channel being downwardly directed, so that the channel fits over the heads 28 of the screws.

In the operation of the device, the heating unit may be located in its lower position, where it is adapted to heat a cooking utensil 30 which may be placed in the well casing 10. The heating unit 12, when sufficiently cool, may be pulled up by hand with a slight twisting motion past the heads 28 of the screws and thereafter may be placed with the legs resting on the heads 28. The end 15 of the heating unit is adapted to slide up and down the slot 11.

The sheathed heater 13 preferably is constructed in the manner disclosed in the patent to W. R. Tuttle, 2,456,343, December 14, 1948.

While the form of embodiment of the invention as herein disclosed, constitutes a preferred form, it is to be understood that other forms might be adopted, as may come within the scope of the claims which follow.

What is claimed is as follows:

1. In combination, a member having an opening provided with a notch, a spring clip having outwardly bent arms extending on either side of said notch resting upon the surface of said member immediately adjacent said opening, said clip having an integral tongue extending through said notch and having an outward bend in the opposite direction in the form of a hook sufficiently long to engage the opposite surface of said member with a spring force to yieldingly hold the clip in place, a threaded screw receiving aperture in said clip, a second member extending into said opening and having an outwardly directed flange overlying said notch and extending into contact with the surface of said first mentioned member, and a fastening screw extending through said second member into said aperture in said clip.

2. In combination; a sheet metal top having an opening surrounded by a downwardly and inwardly deflected flange; a plurality of downwardly directed notches in said inwardly directed flange; a clip secured on said inwardly directed flange adjacent each of said notches and including horizontally oppositely extending arms resting on said inwardly directed flange and a downwardly extending portion provided with a hook engaging and surrounding the lower edge of said notch, and a screw receiving aperture in the body of said clip; an outwardly flanged and downwardly directed heater unit supporting means in said opening with an outward flange resting on said sheet metal top; a large headed screw adjacent each of said notches for each clip extending outwardly through said supporting means and engaging said aperture; and a heater unit provided with a plurality of supporting arms each resting on the head of one of said screws.

3. In combination, a member having an opening provided with a plurality of notches, a spring clip adjacent each notch having outwardly bent arms extending on either side of the adjacent notch resting upon the surface of said member immediately adjacent said opening, each of said clips each having an integral tongue extending through said notch and each having an outward bend in the opposite direction in the form of a hook sufficiently long to engage the opposite surface of said member with a spring force to yieldingly hold the clip in place, a threaded screw receiving aperture in each of said clips, a second member extending into said opening and having an outwardly directed flange overlying said notch and extending into contact with the surface of said first mentioned member, and a fastening screw provided with an elongated head extending through said second member into each of said apertures in said clips, and a heating element having portions of its structure resting upon and supported by the heads of said screws.

References Cited in the file of this patent

UNITED STATES PATENTS

| Number | Name | Date |
|---|---|---|
| 2,325,358 | Andrews | July 27, 1943 |
| 2,414,667 | Price | Jan. 21, 1947 |
| 2,416,645 | Rutenber | Feb. 25, 1947 |
| 2,481,227 | Kuenne | Sept. 6, 1949 |
| 2,502,988 | Price | Apr. 4, 1950 |
| 2,630,518 | Brehm | Mar. 3, 1953 |